(12) United States Patent
Schottler et al.

(10) Patent No.: US 9,975,599 B2
(45) Date of Patent: May 22, 2018

(54) ONE-PIECE DISC BRAKE MOUNT FOR BICYCLE

(71) Applicant: Cycling Sports Group, Inc., Wilton, CT (US)

(72) Inventors: Jonathan Christian Schottler, Freiburg im Breisgau (DE); Christopher Philip Dodman, Basel (CH); Andrew Paul Schmidt, Danbury, CT (US); Darius Shekari, Bethel, CT (US)

(73) Assignee: CYCLING SPORTS GROUP, INC., Wilton, CT (US)

( * ) Notice: Subject to any disclaimer, the term of this patent is extended or adjusted under 35 U.S.C. 154(b) by 42 days.

(21) Appl. No.: 15/000,227

(22) Filed: Jan. 19, 2016

(65) Prior Publication Data

US 2016/0207587 A1   Jul. 21, 2016

Related U.S. Application Data (60) Provisional application No. 62/184,553, filed on Jun. 25, 2015, provisional application No. 62/104,917, filed on Jan. 19, 2015.

(51) Int. Cl.
| | |
|---|---|
| *B62L 1/00* | (2006.01) |
| *F16D 65/00* | (2006.01) |
| *B62K 19/38* | (2006.01) |

(52) U.S. Cl.
CPC .............. *B62L 1/005* (2013.01); *B62K 19/38* (2013.01); *F16D 65/0056* (2013.01)

(58) Field of Classification Search
CPC .................................................... B62K 19/38
See application file for complete search history.

(56) References Cited

U.S. PATENT DOCUMENTS

| | | | | |
|---|---|---|---|---|
| 5,452,911 A | * | 9/1995 | Klein ..................... | B62K 19/02 280/288 |
| 6,497,427 B1 | * | 12/2002 | D'Alusio ................. | B62K 3/04 280/288 |

(Continued)

FOREIGN PATENT DOCUMENTS

| | | | | |
|---|---|---|---|---|
| DE | 202010015144 U1 | * | 3/2011 | ............. B62K 19/30 |
| DE | 102014210198 A1 | | 12/2014 | |

OTHER PUBLICATIONS

EP Extended European Search Report date of Completion of Search Jun. 30, 2016; Date of Search was dated Jul. 12, 2016, which is related to U.S. Appl. No. 15/000,227; 1-9 pages.

*Primary Examiner* — Kevin Hurley
(74) *Attorney, Agent, or Firm* — Cantor Colburn LLP (57) ABSTRACT

A combination for a bicycle includes a one-piece disc brake mount, and a chain stay that forms a portion of a frame of the bicycle. The mount includes: a first protrusion comprising a first elongated shape with a first centrally disposed through-hole; a second protrusion comprising a second elongated shape with a second centrally disposed through-hole; the second through-hole disposed parallel with and spatially apart from the first through-hole; and, an integrally formed web portion fixedly connecting the first protrusion with the second protrusion. The chain stay includes a continuous surface absent any discontinuities in an attachment area configured to receive the mount, wherein the mount is joinable with the chain stay at the attachment area.

15 Claims, 10 Drawing Sheets

(56) References Cited

U.S. PATENT DOCUMENTS

| | | | | |
|---|---|---|---|---|
| 2003/0205882 A1* | 11/2003 | Parkin | ................... | B62K 19/16 |
| | | | | 280/281.1 |
| 2008/0238027 A1* | 10/2008 | Talavasek | .............. | B62K 19/22 |
| | | | | 280/281.1 |
| 2009/0283986 A1* | 11/2009 | Falke | .................... | B62K 19/38 |
| | | | | 280/284 |
| 2012/0126506 A1* | 5/2012 | Zawistowski | ......... | B62K 25/28 |
| | | | | 280/275 |
| 2015/0001012 A1* | 1/2015 | Noborio | ................. | B62L 1/005 |
| | | | | 188/72.4 |
| 2015/0069735 A1* | 3/2015 | Hoogendoorn | ...... | B62K 25/286 |
| | | | | 280/284 |
| 2015/0136540 A1* | 5/2015 | Lucas | ................... | B62K 19/38 |
| | | | | 188/73.35 |

\* cited by examiner

ONE-PIECE DISC BRAKE MOUNT FOR BICYCLE

CROSS REFERENCE TO RELATED APPLICATIONS

This application claims the benefit of U.S. Provisional Application Ser. No. 62/184,553, filed Jun. 25, 2015, and U.S. Provisional Application Ser. No. 62/104,917, filed Jan. 19, 2015, which are incorporated herein by reference in their entireties.

BACKGROUND OF THE INVENTION

The present disclosure relates generally to a bicycle, particularly to a bicycle having a disc brake, and more particularly to a bicycle having a one-piece disc brake mount.

A disc brake mount for a bicycle is disclosed in U.S. Pat. No. 7,140,628.

While existing disc brake mounts for a bicycle may be suitable for their intended purpose, there remains, however, a need in the art for a disc brake mount that provides an improved arrangement of self-locating with respect to a frame member of the bicycle, protection against possible over temperature condition during brazing, and uniform stress distribution during braking.

This background information is provided to reveal information believed by the applicant to be of possible relevance to the present invention. No admission is necessarily intended, nor should be construed, that any of the preceding information constitutes prior art against the present invention.

BRIEF DESCRIPTION OF THE INVENTION

An embodiment of the invention includes a combination for a bicycle, the combination including a one-piece disc brake mount; and a chain stay that forms a portion of a frame of the bicycle. The mount includes: a first protrusion having a first elongated shape with a first centrally disposed through-hole; a second protrusion comprising a second elongated shape with a second centrally disposed through-hole; the second through-hole disposed parallel with and spatially apart from the first through-hole; and, an integrally formed web portion fixedly connecting the first protrusion with the second protrusion. The chain stay includes: a first recess disposed and configured to receive the first protrusion; and, a second recess disposed and configured to receive the second protrusion. The mount is joinable with the chain stay via an inter-engaging relationship of the first and second protrusions with the first and second recesses, respectively.

An embodiment of the invention includes a bicycle having a frame having a plurality of frame members that includes a left chain stay, and a one-piece disc brake mount fixedly joined to the left chain stay. The mount includes: a first protrusion comprising a first elongated shape with a first centrally disposed through-hole; a second protrusion comprising a second elongated shape with a second centrally disposed through-hole; the second through-hole disposed parallel with and spatially apart from the first through-hole; and, an integrally formed web portion fixedly connecting the first protrusion with the second protrusion. The chain stay includes: a first recess disposed and configured to receive the first protrusion; and, a second recess disposed and configured to receive the second protrusion. The mount is joined with the chain stay via an inter-engaging relationship of the first and second protrusions with the first and second recesses, respectively.

An embodiment of the invention includes a combination for a bicycle, the combination including a one-piece disc brake mount, and a chain stay that forms a portion of a frame of the bicycle. The mount includes: a first protrusion comprising a first elongated shape with a first centrally disposed through-hole; a second protrusion comprising a second elongated shape with a second centrally disposed through-hole; the second through-hole disposed parallel with and spatially apart from the first through-hole; and, an integrally formed web portion fixedly connecting the first protrusion with the second protrusion. The chain stay includes a continuous surface absent any discontinuities in an attachment area configured to receive the mount, wherein the mount is joinable with the chain stay at the attachment area.

The above features and advantages and other features and advantages of the invention are readily apparent from the following detailed description of the invention when taken in connection with the accompanying drawings.

BRIEF DESCRIPTION OF THE DRAWINGS

Referring to the exemplary non-limiting drawings wherein like elements are numbered alike in the accompanying Figures, or referred to herein with like names.

DETAILED DESCRIPTION OF THE INVENTION

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

An embodiment of the invention, as shown and described by the various figures and accompanying text, provides a one-piece disc brake mount that is bondable to a chain stay of a bicycle. While embodiments described herein depict a certain outer profile for a disc brake mount, it will be appreciated that the disclosed invention is also applicable to other outer profiles.

Figure 1A:
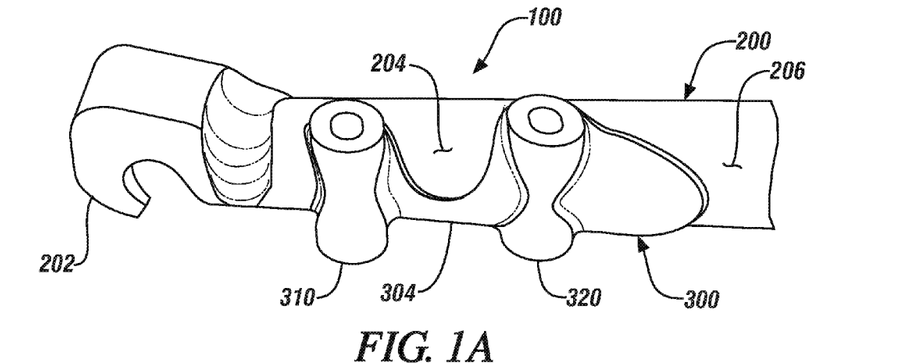
FIG. 1A depicts a portion of a left chain stay and a one-piece disc brake mount in combination, in accordance with an embodiment of the invention.

FIG. 1A depicts a combination 100 for a bicycle 1000 (best seen with reference to FIGS. 8A and 8B), where the combination 100 includes a left chain stay 200 (only a portion depicted in FIG. 1A) and a one-piece disc brake mount 300 (herein referred to as "mount"), with a left rear drop-out 202 depicted in the rear of the chain stay 200. As will be recognized by one skilled in the art, the left chain stay 200 forms a portion of a frame 1002 of the bicycle 1000. In an embodiment, the chain stay 200 plus brazed-on dropout 202 plus brazed-on one-piece disc brake mount 300 is about 40% lighter and runs about 4-times the fatigue life of a prior art design of a forged dropout and welded chain stay, and surpassed an industry standard fatigue life test used for Tandem bicycles.

Figure 1B:
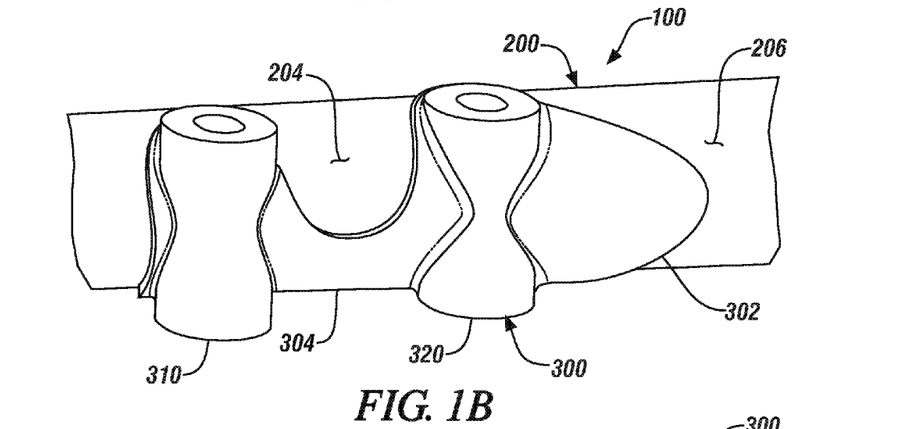
FIG. 1B depicts the combination depicted in FIG. 1A, but with the outer periphery of the mount more clearly illustrated.

FIG. 1B depicts the combination 100 depicted in FIG. 1A, but with the outer periphery 302 of the mount 300 more clearly illustrated. In an embodiment, the chain stay 200 and the mount 300 in the brazed areas (discussed further below) have similar thicknesses, which serves to prevent overheating during the brazing process.

Figure 2A:
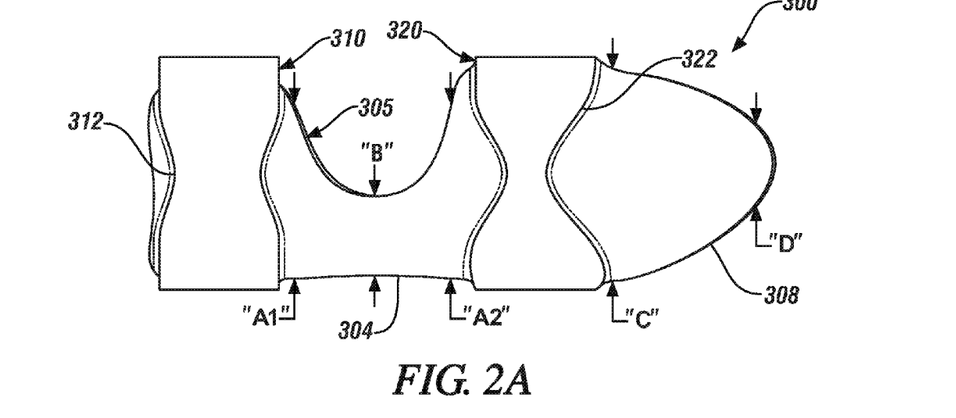
FIGS. 2A and 2B depict front and back views, respectively, of the mount.
Figure 2B:
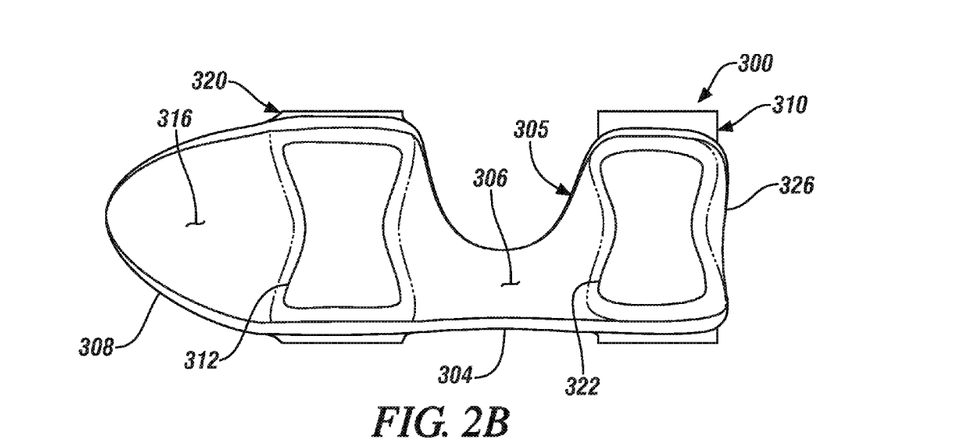

FIGS. 2A and 2B depict front and back views, respectively, of the mount 300. As depicted, the mount 300 has a first (rearward) protrusion 310 comprising a first elongated shape 312 with a first centrally disposed through-hole 314 (best seen with reference to FIG. 2D); a second (forward) protrusion 320 comprising a second elongated shape 322 with a second centrally disposed through-hole 324 (best seen with reference to FIG. 2D), the second through-hole 324 disposed parallel with and spatially apart from the first through-hole 314; and, an integrally formed web portion 304 fixedly connecting the first protrusion 310 with the second protrusion 320, where the web portion 304 has a U-shaped cutout 305. In an embodiment, the first elongated shape 312 of the first protrusion 310 has an hour-glass-like shape (also herein referred to by reference numeral 312), and the second elongated shape 322 of the second protrusion 320 has an hour-glass-like shape (also herein referred to by reference numeral 322). The hour-glass-like shapes 312, 322 provide for reduced weight as compared to a uniform cylindrical shape having the same maximum outer dimension of the respective protrusions 310, 320 and the same minimum inner dimensions of the respective through-holes 314, 324, while also providing for effective stress distribution during braking of the bicycle 1000. In an embodiment, the first through-hole 314 and the second through-hole 324 each comprise a non-circular cross-section (as depicted in FIG. 2D). In an embodiment, the first through-hole 314 and the second through-hole 324 each comprise an un-threaded internal surface (as depicted in FIG. 2D). While the first and second protrusions 310, 320 are depicted having an hour-glass-like shape 312, 314, it will be appreciated that other shapes may be employed without detracting from the scope of the invention disclosed herein. Any and all shapes that satisfy the scope of the invention are contemplated and considered to be within the scope of at least some of the appended claims.

With reference still to FIGS. 2A and 2B, the web portion 304 of the mount 300 is disposed between and seamlessly joined with the first protrusion 310 and the second protrusion 320, the web portion 304 having an inner surface contour 306 that matches an outer surface contour 204 of the chain stay 200 (best seen with reference to FIGS. 1A and 1B) to provide a surface-to-surface contact when the mount 300 is in an inter-engaging relationship with the chain stay 200. In an embodiment, the web portion 304 is wider proximate each of the first and second protrusions 310, 320 than at a region about halfway between the first and second protrusions 310, 320, as depicted by respective dimensions "A1", "A2" and "B" in FIG. 2A. In an embodiment, the mount 300 further comprises an integrally formed extension portion 308 disposed extending from and seamlessly joined with the second protrusion 320 on a side opposite the web portion 304, the extension portion 308 having an inner surface contour 316 that matches an outer surface contour 206 of the chain stay 200 (best seen with reference to FIGS. 1A and 1B) to provide a surface-to-surface contact when the mount 300 is in an inter-engaging relationship with the chain stay 200. In an embodiment, the extension portion 308 is wider proximate the second protrusion 320 than at a distal end of the extension portion 308, as depicted by respective dimensions "C" and "D" in FIG. 2A. In an embodiment, a thickness of the web portion 304 and a thickness of the extension portion 308 are both about equal to a thickness of a wall of the chain stay 200 in the area of engagement, which serves to prevent overheating during a brazing process, when brazed as opposed to bonded by another adhesion means.

Figure 2C:
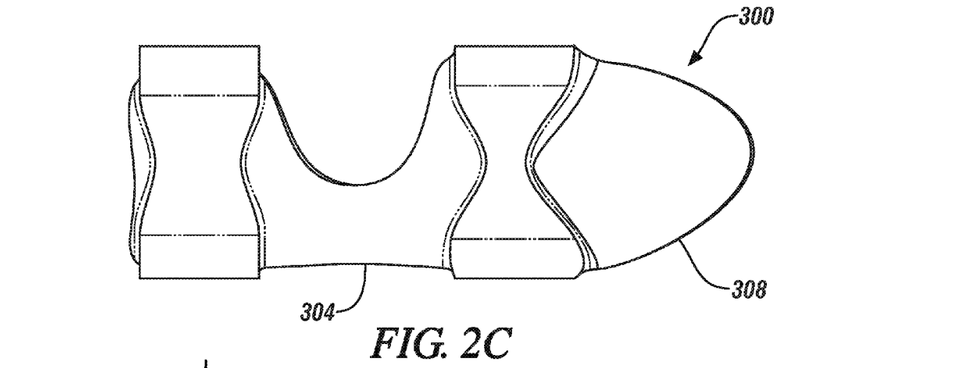
FIG. 2C depicts a front view of the mount similar to that of FIG. 2A.
Figure 2D:
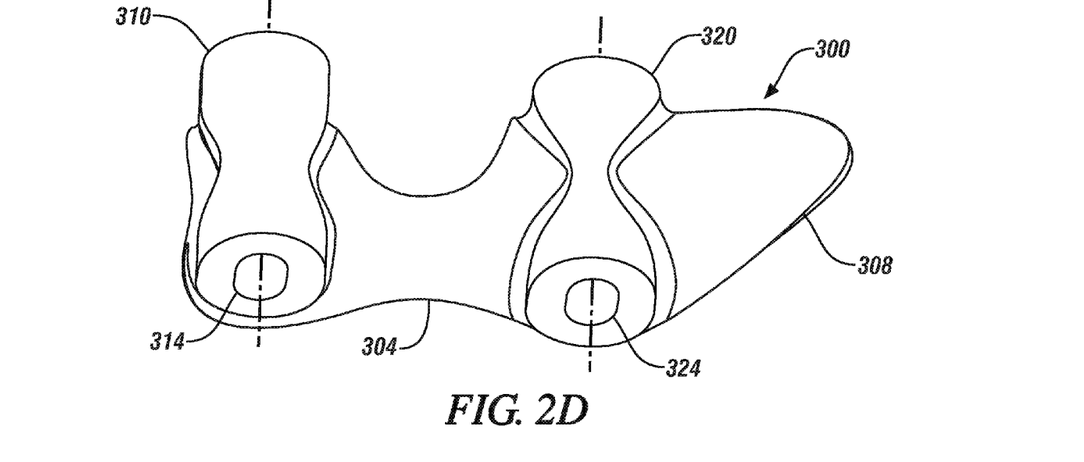
FIG. 2D depicts a bottom front perspective view of the mount.

FIG. 2C depicts a front view of the mount 300 similar to that of FIG. 2A, but with the extension portion 308 delineated as having a shape suitable for distributing braking loads, increasing strength, and improving fatigue life of the mount.

FIG. 2D depicts a bottom front perspective view of the mount 300, with the outer profile of the web portion 304 and extension portion 308 delineated as having a shape to displace and balance stress through the mount 300 and chain stay 200.

Figure 2E:
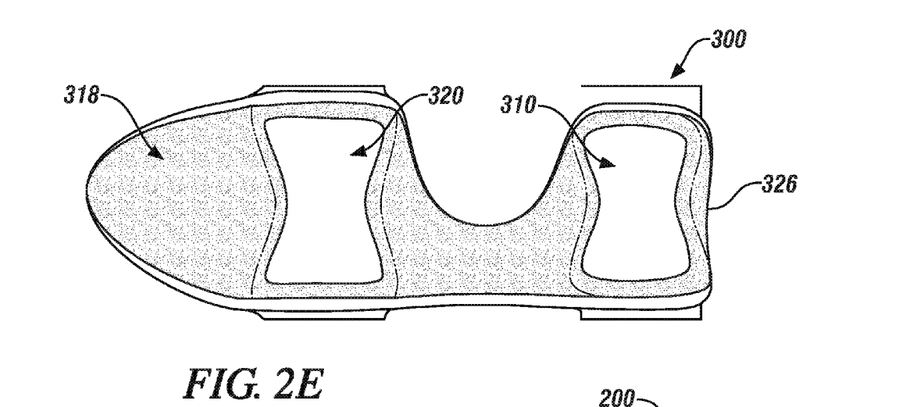
FIG. 2E depicts a back view of the mount similar to that of FIG. 2B.

FIG. 2E depicts a back view of the mount 300 similar to that of FIG. 2B, but with brazing or bonding regions 318 delineated, where the back surface of the first and second protrusions 310, 320 are in a non-bonding region to provide a means for locating the mount 300 on a mitered chain stay 200, which is now described with reference to FIG. 3.

Figure 3:
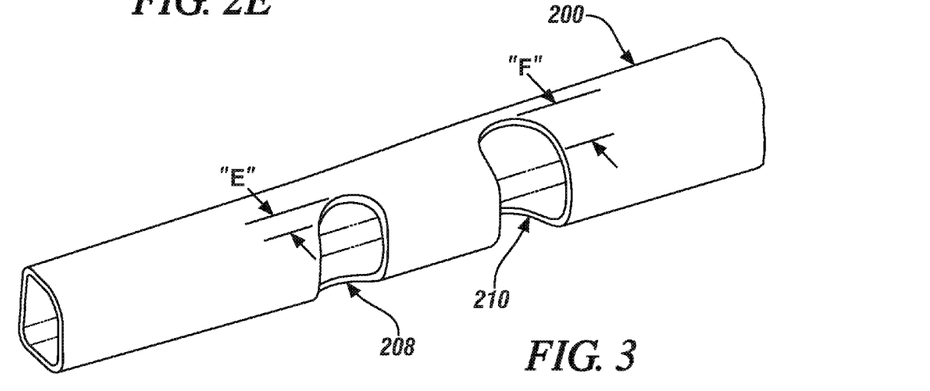
FIG. 3 depicts a portion of the left chain stay, in accordance with an embodiment of the invention.

FIG. 3 depicts a portion of the left chain stay 200, which has a first (rearward) recess 208 disposed and configured to receive the first protrusion 310; and a second (forward) recess 210 disposed and configured to receive the second protrusion 320. In an embodiment, the second recess 210 is formed deeper into the chain stay 200 than the first recess 208, depicted by dimension "F" being greater than dimension "E", which permits a plane of operation of a disc of a disc brake to be parallel with a central plane of the bicycle frame 1002 while the chain stay 200, or at least the left chain stay, is not parallel with the central plane of the bicycle frame 1002 (best seen with reference to FIG. 8B). The left chain stay 200 with the first and second recesses 208, 210 is also herein referred to as a mitered chain stay, where the miters (recesses) serve to fit and position the brake mount 300 (best seen with reference to FIG. 8B).

With reference back to FIGS. 1A, 1B and 3, and as depicted therein, the mount 300 is joinable with the chain 200 stay via an inter-engaging relationship of the first and second protrusions 310, 320 with the first and second recesses 208, 210, respectively. In an embodiment, the mount 300 is bonded to the chain stay 200 at the web portion 304. In an embodiment, the chain stay 200 and mount 300 are made from aluminum, and the mount 300 is bonded to the chain stay 200 at the web portion 304 via a braze. In an embodiment, the chain stay 200 and mount 300 are made from a composite, and the mount 300 is bonded to the chain stay 200 at the web portion 304 via an adhesive. In an embodiment, the chain stay 200 is composite, the brake mount 300 is bonded on, and the brake mount 300 is overwrapped with carbon tape or cut prepregnated composite fiber material, which adds strength and eliminates paint cracking from microscopic movement across the bond joint. While certain materials are described herein in connection with the chain stay 200 and mount 300, it will be appreciated that other materials suitable for a purpose disclosed herein may also be employed without detracting from the scope of the invention. Any and all such materials are contemplated and considered to be within the scope of at least some of the appended claims.

Figure 4:
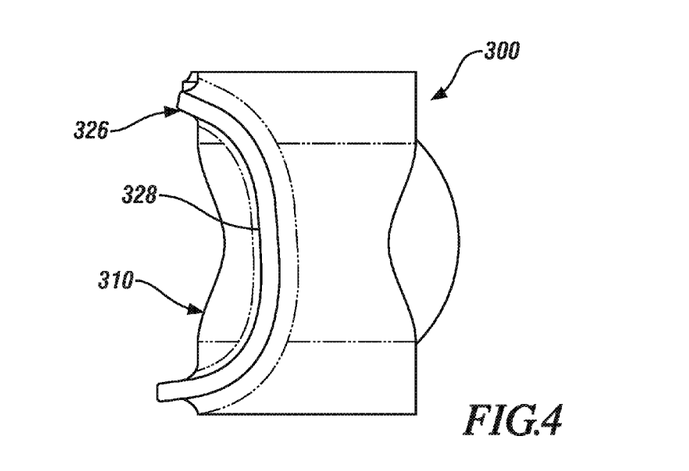
FIG. 4 depicts a rear view of the mount, in accordance with an embodiment of the invention.

FIG. 4 depicts a rear view of the mount 300, which clearly depicts the first protrusion 310 having a D-shaped lip 326 on a side opposite the web portion 304 (best seen with reference to FIG. 1A for example) (the D-shaped lip 326 is also depicted in FIGS. 2B and 2E), the D-shaped lip 326 having an inner surface contour 328 that matches an outer surface contour 206 of the chain stay 200 in the area of engagement to provide a surface-to-surface contact when the mount 300 is in an inter-engaging relationship with the chain stay 200. The D-shaped lip 326 on the mount 300 permits the mount 300 to be forged, cast, or molded with a suitable draft angle for an inter-engaging fit with the chain stay 200.

Figure 5:
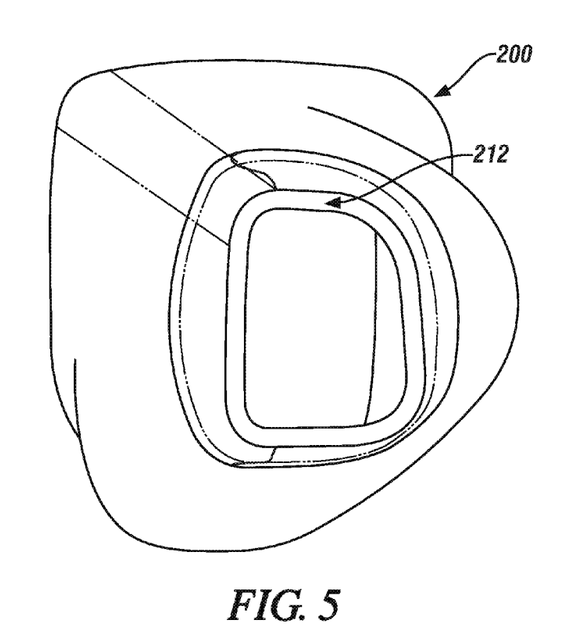
FIG. 5 depicts a rear section view of the left chain stay cut through a region proximate a first recess, in accordance with an embodiment of the invention.

FIG. 5 depicts a rear section view of the left chain stay 200 cut through a region proximate the first recess 208 where the first protrusion 310 engages. As depicted, chain stay 200 is hollow and the portion proximate the first recess 208 of the chain stay has a D-shaped outer profile 212 to fit with the D-shaped lip 326 at the first protrusion 310 of the mount 300. In an embodiment, the D-shaped outer profile 212 on the chain stay 200 is formed with simple press form tooling. The combination of the D-shaped lip 326 on the mount 300 and the D-shaped outer profile 212 on the chain stay 200 provides for a greater joining surface area of the assembly as compared to an assembly absent such features.

Figure 6:
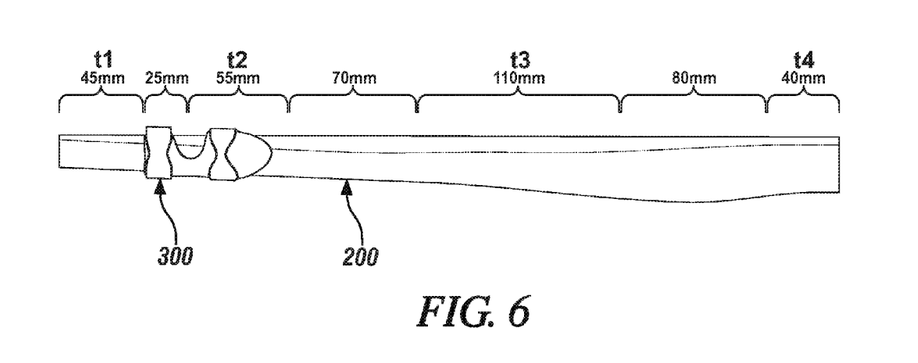
FIG. 6 depicts a front view of an embodiment of the chain stay having a multi-butted construction, in accordance with an embodiment of the invention.

FIG. 6 depicts an embodiment of the left chain stay 200 having a multi-butted construction, which maximizes strength and fatigue life while minimizing deflection under braking load. As depicted, an embodiment of the multi-butted construction provides a chain stay 200 that varies in wall thickness (progressing rearward to forward) from 1.8 mm thickness (with 45 mm length), tapering to 1.5 mm thickness (with 55 mm length), tapering to 0.7 mm thickness (with 110 mm length), and tapering to 1.0 mm thickness (with 40 mm length), with the regions of taper varying length (25 mm, 70 mm and 80 mm, respectively) in between the defined thickness regions.

Figure 7:
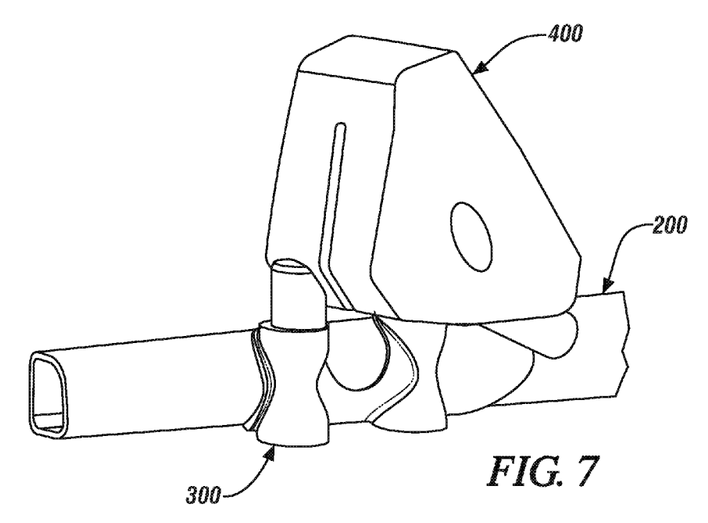
FIG. 7 depicts an assembly of a disc brake mounted to a mount and chain stay, in accordance with an embodiment of the invention.

FIG. 7 depicts an assembly of a disc brake 400 mounted to the mount 300 and chain stay 200 as herein described and illustrated.

Figure 8A:
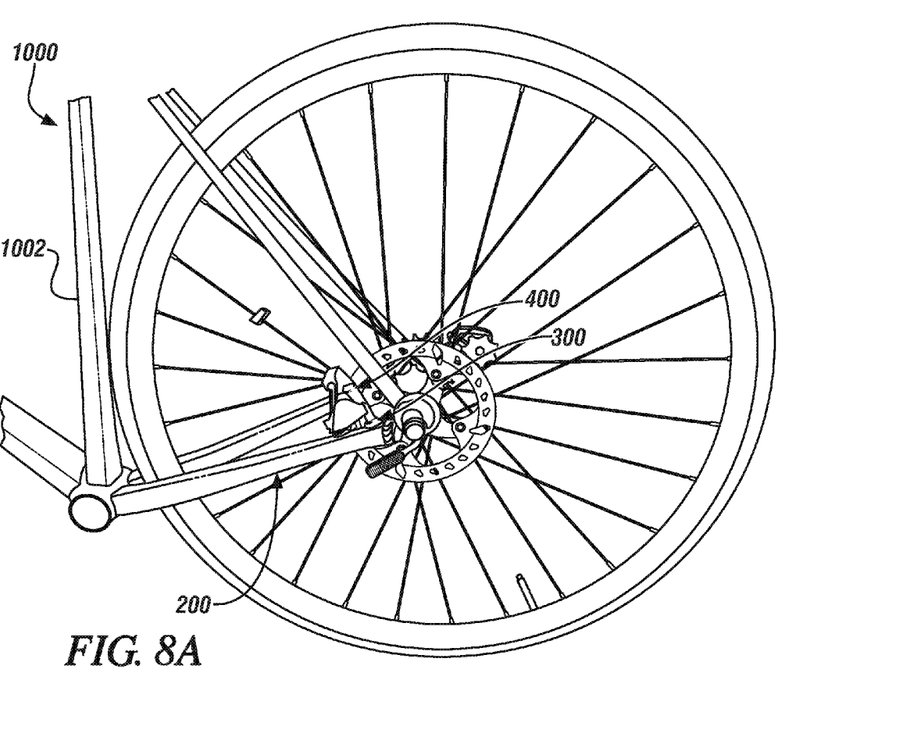
FIGS. 8A and 8B depict a rear portion of a bicycle suitable for use with a chain stay, mount, and disc brake, in accordance with an embodiment of the invention.
Figure 8B:
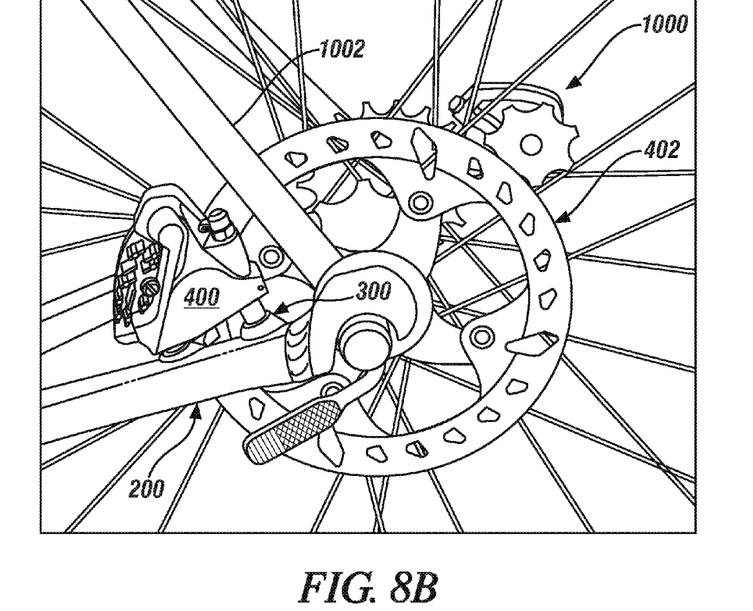

FIGS. 8A and 8B depict a rear portion of a bicycle 1000 suitable for use with a chain stay 200, mount 300, and disc brake 400, as herein described and illustrated. With reference to FIG. 8B, it can be seen that a plane of operation of a disc 402 of the disc brake 400 is disposed parallel with a central plane of the bicycle frame 1002, while the chain stay 200, or at least the left chain stay, may not necessarily be disposed parallel with the central plane of the bicycle frame 1002. While FIGS. 8A and 8B depict only a rear portion of a bicycle, it will be appreciated that other portions, such as the front fork portion and middle seat portion, are well known in the art and require no detailed discussion herein.

Figure 9A:
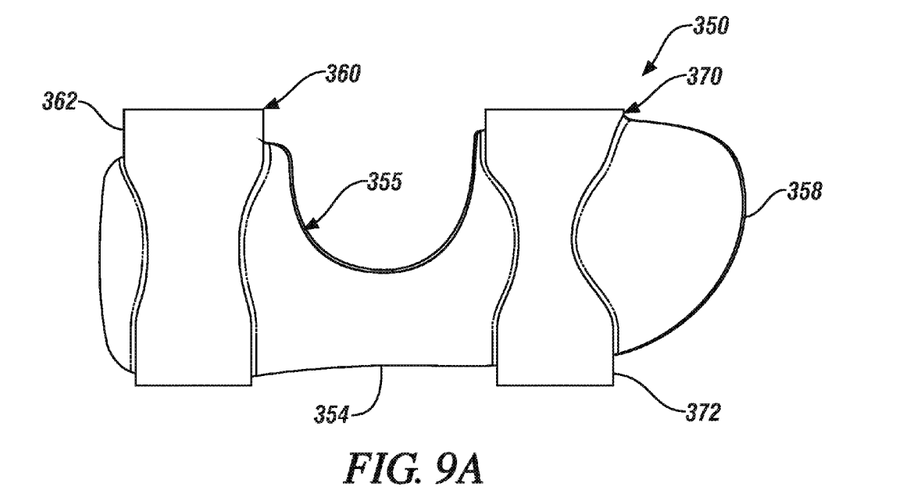
FIGS. 9A and 9B depict front and back views, respectively, of another mount similar but alternative to that depicted in FIGS. 2A and 2B, in accordance with an embodiment of the invention.
Figure 9B:
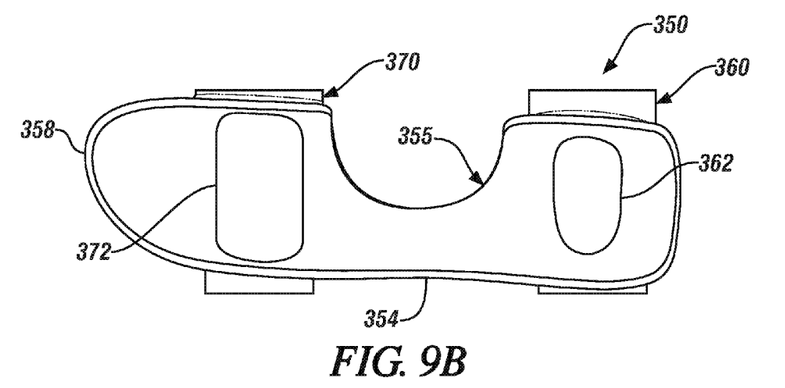
Figures 9C, 10:
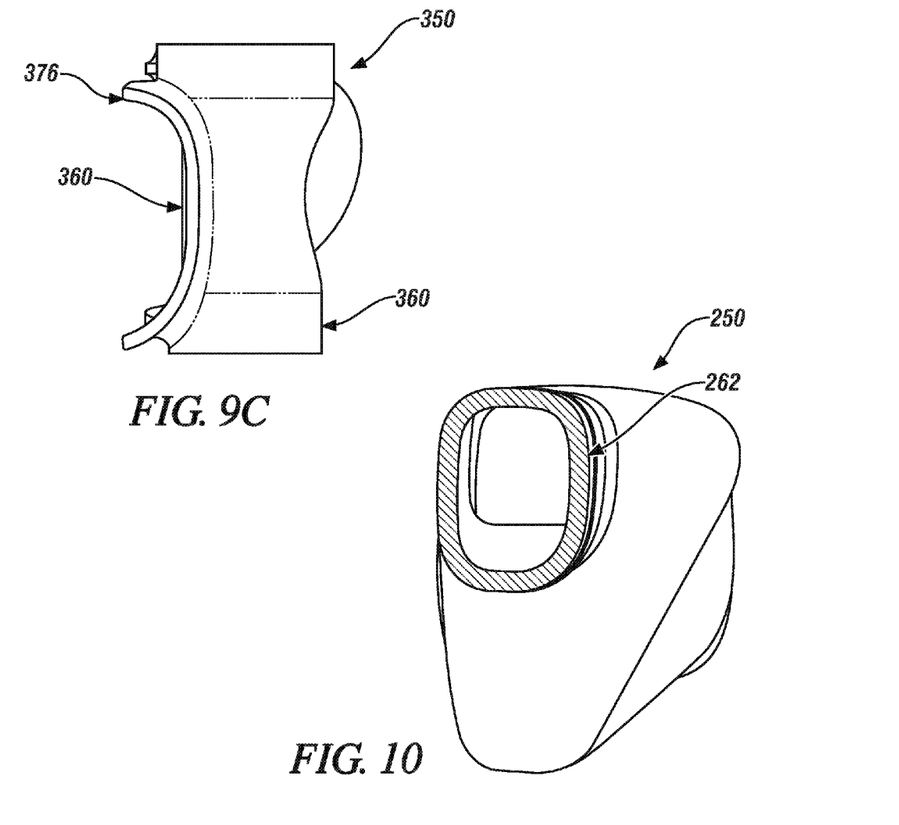
FIG. 9C depicts a rear view of the mount of FIGS. 9A and 9B, similar but alternative to that depicted in FIG. 4, in accordance with an embodiment of the invention.
FIG. 10 depicts a rear section view of another left chain stay cut through a region proximate a first recess, similar but alternative to that depicted in FIG. 5, in accordance with an embodiment of the invention.
Figure 11:
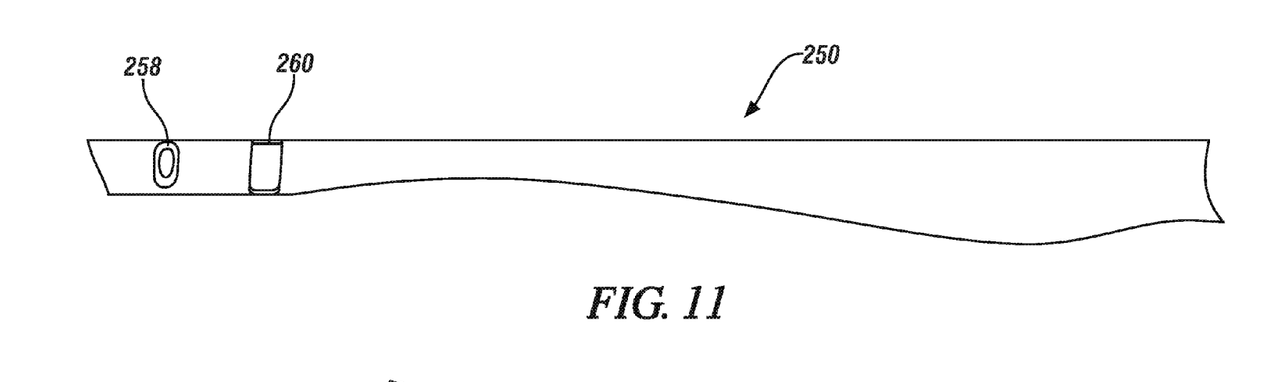
FIG. 11 depicts a front view of the chain stay of FIG. 10, similar but alternative to that depicted in FIG. 6, in accordance with an embodiment of the invention.

Reference is now made to FIGS. 9-11, which depict a second embodiment of a one-piece disc brake mount 350 (herein also referred to as a second mount embodiment) similar in many respects but alternative to that depicted in FIGS. 1-7 (herein also referred to as a first mount embodiment).

FIGS. 9A, 9B and 9C depict the second mount embodiment 350 having a shape similar but different from that of the first mount embodiment 300. For example, comparing FIG. 9A with FIG. 2A shows that the front view of the hour-glass-like shape of the first and second elongated shapes 362, 372 (compared with 312, 322) of the first and second protrusions 360, 370 (compared with 310, 320), respectively, are less pronounced in the second mount embodiment 350 than in the first mount embodiment 300. Comparing FIG. 9B with FIG. 2B shows that the back view of the first and second elongated shapes 362, 372 of the first and second protrusions 360, 370, respectively, are cylindrical in the second mount embodiment 350 as compared to hour-glass-like shaped in the first mount embodiment 300. FIGS. 9A and 9B also depict web 354 and extension 358 portions similar but slightly different from those depicted in FIGS. 2A and 2b. For example, the U-shaped cutout 355 of the web portion 354 is slightly different widthwise between the first and second mount embodiments 300, 350 (wider contour at the bottom in the second mount 350 as compared with the first mount 300), and the extension portion 358 is slightly shorter in the second mount embodiment 350 than in the first mount embodiment 300. Comparing FIG. 9C with FIG. 4 it can be seen that the second mount embodiment 350 has a D-shaped lip 376 at the first protrusion 360 similar to that of the first mount embodiment 300. FIG. 9C also shows that the back of the first and second protrusions 360, 370 of the second mount embodiment 350 are less protruding than those of the first mount embodiment 300, which serves to reduce the amount of mitering needed on the chain stay 250, which is contemplated to improve the overall strength of the chain stay 200 and mount 350 combination when joined together, via brazing for example. The different degrees of mitering (258, 260 in FIG. 11) needed on the chain stay 200 for the first 300 and second 350 mount embodiments can be seen by comparing FIG. 3 (chain stay 200 for first mount embodiment) with FIG. 11 (chain stay 250 for second mount embodiment), particularly with respect to the first recess (miter) 258 (compared with 208 depicted in FIG. 3) for the first (rearward) protrusion 360 depicted in FIG. 9A (compared with 310 depicted in FIG. 2A).

FIG. 10 depicts a section view of the chain stay 250 for the second mount embodiment 350 similar to that of FIG. 5 depicting the chain stay 200 for the first mount embodiment 300. As depicted via the section cut, the chain stay 250 is hollow and the portion proximate the first recess 258 of the chain stay 250 has a D-shaped outer profile 262 to fit with the D-shaped lip 376 at the first protrusion 360 of the mount 350 (see FIG. 9C).

Reference is now made to FIGS. 12A-14, which depict a third embodiment of a one-piece disc brake mount 500 (herein also referred to as a third mount embodiment) similar in many respects but alternative to the first mount embodiment 300 depicted in FIGS. 1-7, and to the second mount embodiment 350 depicted in FIGS. 9-11.

Figure 12A:
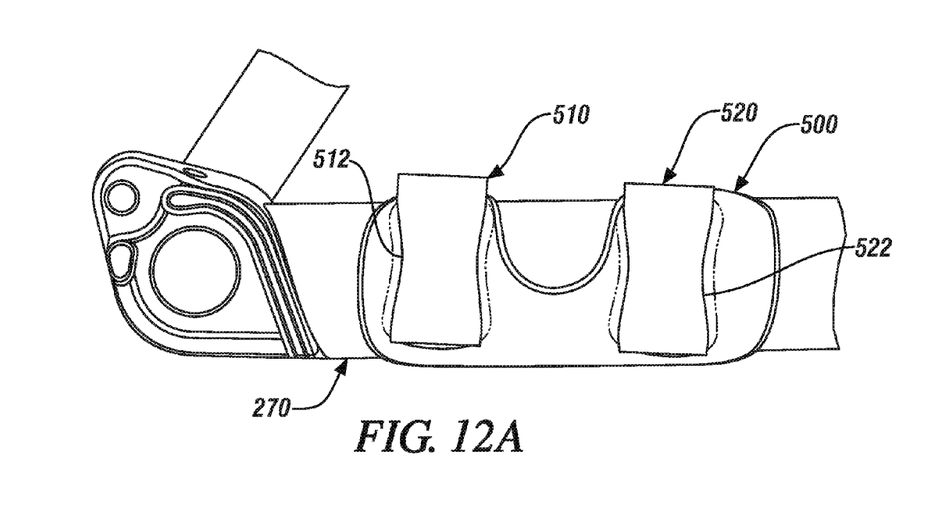
FIGS. 12A and 12B depict front and back views, respectively, of another mount similar but alternative to that depicted in FIGS. 9A and 9B, in accordance with an embodiment of the invention.
Figure 12B:
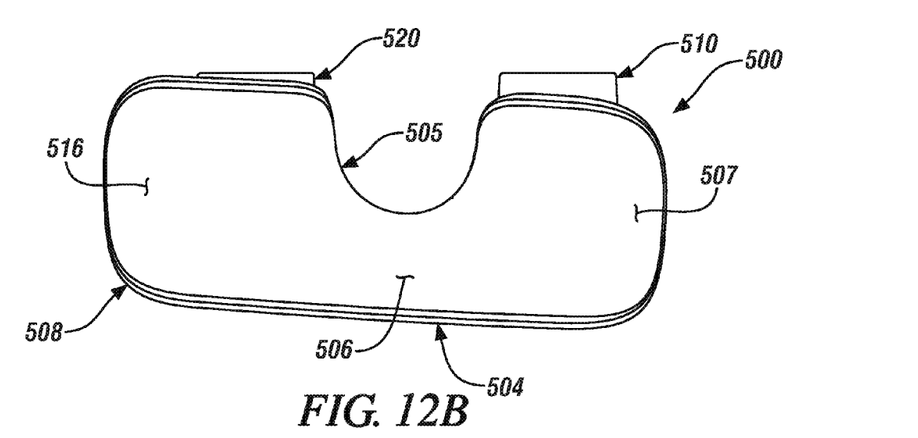
Figure 12C:
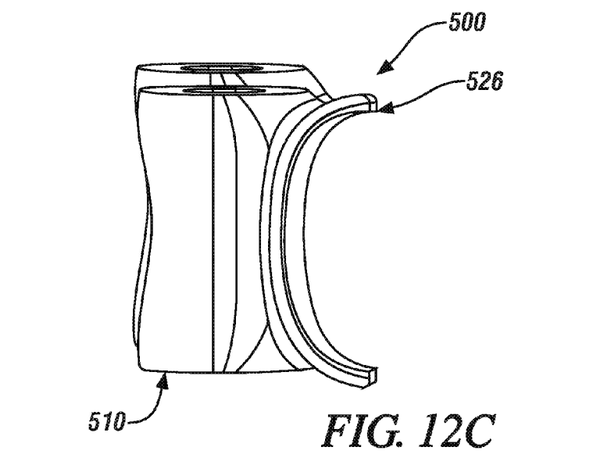
FIG. 12C depicts a rear view of the mount of FIGS. 12A and 12B, similar but alternative to that depicted in FIG. 9C, in accordance with an embodiment of the invention.

FIGS. 12A, 12B and 12C depict the third mount embodiment 500 having a shape similar but different from that of the first and second mount embodiments 300, 350. For example, comparing FIG. 12A with FIG. 9A shows that the front view of the hour-glass-like shapes of the first and second elongated shapes 512, 522 of the first and second protrusions 510, 520, respectively, are less pronounced in the third mount embodiment 500 than in the second mount embodiment 350. Comparing FIG. 12B with FIGS. 2B and 9B shows that the back view of the first and second elongated shapes of the first and second protrusions 510, 520, respectively, are absent in the third mount embodiment 500 as compared to an hour-glass-like shapes 312, 322 in the first mount embodiment 300 and a cylindrical shapes 362, 372 in the second mount embodiment 350, as evidenced by the back surface 507 of the third mount 500 being smooth and continuous with the surfaces 506, 516 of the web 504 and extension 508 portions absent any projections therebetween. FIGS. 12A and 12B also depict the web 504 and extension 508 portions similar but slightly different from those depicted in FIGS. 2A and 2b. For example, the U-shaped cutout 505 of the web portion 504 is slightly different between the first 300 and third 500 mount embodiments, and the extension portion 508 is substantially shorter in the third mount embodiment 500 than in the first mount embodiment 300. Comparing FIG. 12C with FIG. 4 it can be seen that the third mount embodiment 500 has a D-shaped lip 526 proximate the first protrusion 510 similar to that of the first mount embodiment 300. FIGS. 12B and 12C further show that the back of the first and second protrusions 510, 520 of the third mount embodiment 500 are completely absent in the third mount embodiment 500, which serves to eliminate the need for any mitering on the chain stay 270 (depicted in FIG. 12A), which is contemplated to further improve the overall strength of the chain stay 270 and mount 500 combination when joined together, via brazing for example. In an embodiment of the third mount embodiment 500, the back surface 507 of the mount 500 is absent any protrusions and is shaped to match the outer surface of the chain stay 270 in the attachment area, the chain stay 270 for the third mount embodiment 500 being absent any mitered recesses and having a continuous surface absent any discontinuities in the attachment area of the third mount 500.

Figure 13:
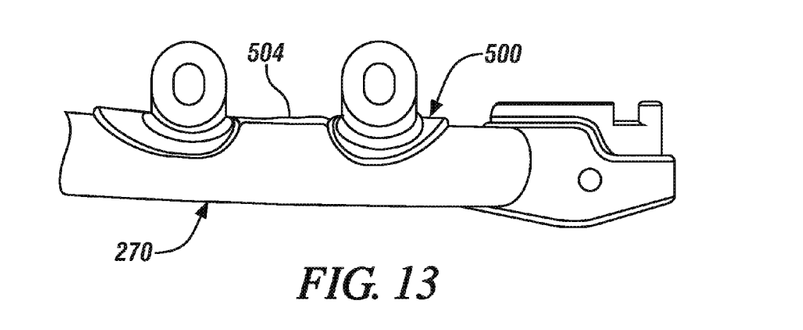
FIG. 13 depicts a top view of a portion of another left chain stay and the one-piece disc brake mount of FIGS. 12A, 12B and 12C, in combination, similar but alternative to that depicted in FIG. 1A, in accordance with an embodiment of the invention.
Figure 14:
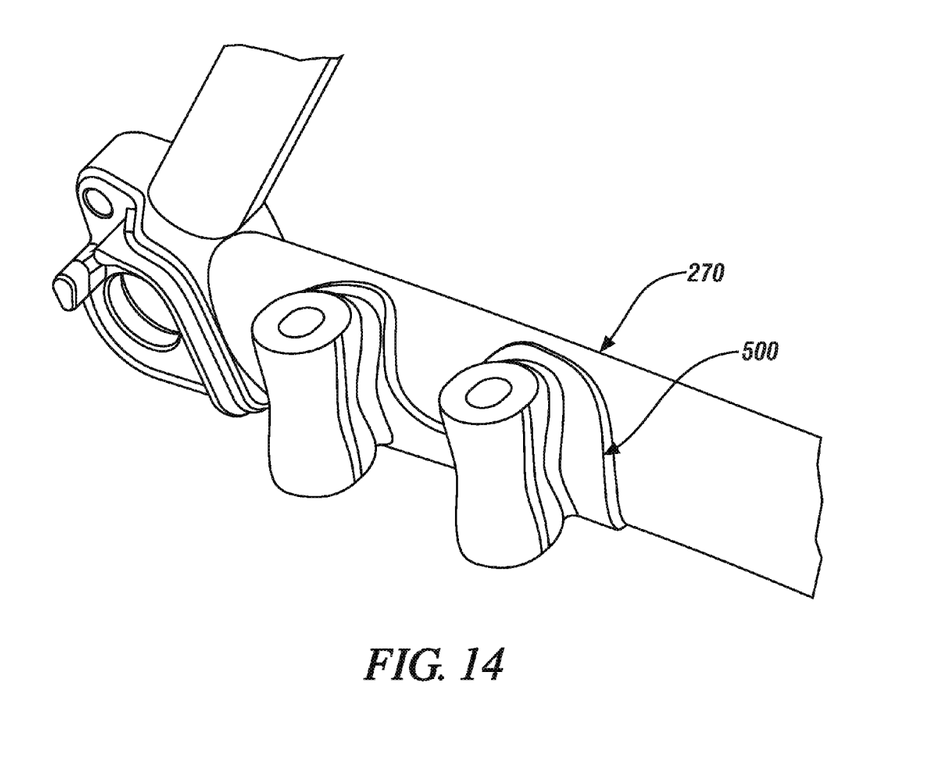
FIG. 14 depicts a perspective view of the combination depicted in FIG. 13, in accordance with an embodiment of the invention.

FIG. 13 depicts a top plan view and FIG. 14 depicts a perspective view of the combination of chain stay 270 and third mount 500 depicted in FIG. 12A, the features of which being described above in connection with FIGS. 12A, 12B and 12C.

In an embodiment of the first mount embodiment 300, the first protrusion 310 has a first outside overall width, the second protrusion 320 has a second outside overall width, the web portion 304 has a first length between the first and second outside overall widths, the extension portion 308 has a second length that extends from the second outside overall width in a direction away from the first and second protrusion 310, 320, the first outside overall width is about equal to the second outside overall width, the ratio of the first length to the first outside overall width or to the second outside overall width is equal to or greater than 1, and equal to or less than 2 (or alternatively equal to or less than 1.7), and the ratio of the second length to the first length is equal to or less than 1, and equal to or greater than 0.7 (or alternatively equal to or greater than 0.8).

In an embodiment of the second mount embodiment 350, the first protrusion 360 has a first outside overall width, the second protrusion 370 has a second outside overall width, the web portion 354 has a first length between the first and second outside overall widths, the extension portion 358 has a second length that extends from the second outside overall width in a direction away from the first and second protrusion 360, 370, the first outside overall width is about equal to the second outside overall width, the ratio of the first length to the first outside overall width or to the second outside overall width is equal to or greater than 1, and equal to or less than 2 (or alternatively equal to or less than 1.7), and the ratio of the second length to the first length is equal to or less than 0.7 (or alternatively equal to or less than 0.6), and equal to or greater than 0.4 (or alternatively equal to or greater than 0.5).

In an embodiment of the third mount embodiment 500, the first protrusion 510 has a first outside overall width, the second protrusion 520 has a second outside overall width, the web portion 504 has a first length between the first and second outside overall widths, the extension portion 508 has a second length that extends from the second outside overall width in a direction away from the first and second protrusion 510, 520, the first outside overall width is about equal to the second outside overall width, the ratio of the first length to the first outside overall width or to the second outside overall width is equal to or greater than 1, and equal to or less than 2 (or alternatively equal to or less than 1.7), and the ratio of the second length to the first length is equal to or less than 0.6 (or alternatively equal to or less than 0.5, and equal to or greater than 0.3 (or alternatively equal to or greater than 0.4).

An embodiment of the invention, as depicted and described by the various figures and accompanying text, provides a disc brake mount formed having a single one-piece body construction. As used herein, the term one-piece body construction means a body having no parts that can be completely separated from another part prior to assembly to the chain stay, and containing no parts that are not integrally formed, where the term integrally formed means formed with material common to and seamless with the rest of the body absent material discontinuities from one region of the body to another, such as a body produced from a machined or forged metal-working process, for example.

As disclosed, some embodiments of the invention may include some of the following advantages: lighter weight construction as compared to prior art disc brake systems for bicycles; stronger construction as compared to prior art disc brake systems for bicycles; more uniform stress distribution during braking as compared to prior art disc brake systems for bicycles; and, self-locating features for assembly and bonding of the disc brake mount to the chain stay.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A combination for a bicycle, comprising:
   a one-piece disc brake mount having a single one-piece body construction; and
   a chain stay that forms a portion of a frame of the bicycle;
   wherein the mount comprises:
      a first protrusion comprising a first elongated shape with a first centrally disposed through-hole;
      a second protrusion comprising a second elongated shape with a second centrally disposed through-hole;
      the second through-hole disposed parallel with and spatially apart from the first through-hole;
      an integrally formed web portion fixedly connecting the first protrusion with the second protrusion;
   wherein the chain stay comprises:
      a first recess disposed and configured to receive the first protrusion; and
      a second recess disposed and configured to receive the second protrusion; and
   wherein the mount is formed separate from the chain stay and is joinable with the chain stay via an inter-engaging relationship of the first and second protrusions with the first and second recesses, respectively.

2. The combination of claim 1, wherein:
   the web portion is disposed between and seamlessly joined with the first protrusion and the second protrusion, the web portion having an inner surface contour that matches an outer surface contour of the chain stay to provide a surface-to-surface contact when the mount is in an inter-engaging relationship with the chain stay.

3. The combination of claim 2, wherein:
   the web portion is wider proximate each of the first and second protrusions than at a region about halfway between the first and second protrusions.

4. The combination of claim 2, wherein:
   the mount further comprises an integrally formed extension portion disposed extending from and seamlessly joined with the second protrusion on a side opposite the web portion, the extension portion having an inner surface contour that matches an outer surface contour of the chain stay to provide a surface-to-surface contact when the mount is in an inter-engaging relationship with the chain stay.

5. The combination of claim 4, wherein:
   the extension portion is wider proximate the second protrusion than at a distal end of the extension portion.

6. The combination of claim 4, wherein:
   a thickness of the web portion and a thickness of the extension portion are both about equal to a thickness of a wall of the chain stay.

7. The combination of claim 1, wherein:
   the second recess is cut deeper into the chain stay than the first recess.

8. The combination of claim 1, wherein:
   the first protrusion comprises a D-shaped lip on a side opposite the web portion, the D-shaped lip having an inner surface contour that matches an outer surface contour of the chain stay to provide a surface-to-surface contact when the mount is in an inter-engaging relationship with the chain stay.

9. The combination of claim 1, wherein:
   when the mount is in an inter-engaging relationship with the chain stay, and the frame of the bicycle is oriented for riding relative to ground, the mount is disposed on a side of the chain stay closest to a central plane of the frame.

10. The combination of claim 1, wherein:
    the chain stay comprises a multi-butted construction.

11. The combination of claim 8, wherein:
    the mount is bonded to the chain stay at the web portion and the D-shaped lip.

12. The combination of claim 8, wherein:
    the mount is bonded to the chain stay at the web portion and the D-shaped lip via a braze or an adhesive.

13. A bicycle, comprising:
    a frame having a plurality of frame members that includes a left chain stay; and
    a one-piece disc brake mount fixedly joined to the left chain stay;
    wherein the mount comprises:
       a single one-piece body construction;
       a first protrusion comprising a first elongated shape with a first centrally disposed through-hole;
       a second protrusion comprising a second elongated shape with a second centrally disposed through-hole;
       the second through-hole disposed parallel with and spatially apart from the first through-hole;
       an integrally formed web portion fixedly connecting the first protrusion with the second protrusion;
    wherein the chain stay comprises:
       a first recess disposed and configured to receive the first protrusion; and
       a second recess disposed and configured to receive the second protrusion; and
    wherein the mount is formed separate from the chain stay and is joined with the chain stay via an inter-engaging relationship of the first and second protrusions with the first and second recesses, respectively.

14. A combination for a bicycle, comprising:
a one-piece disc brake mount; and
a chain stay that forms a portion of a frame of the bicycle;
wherein the mount comprises:
   a first protrusion comprising a first elongated shape with a first centrally disposed through-hole;
   a second protrusion comprising a second elongated shape with a second centrally disposed through-hole;
   the second through-hole disposed parallel with and spatially apart from the first through-hole;
   an integrally formed web portion fixedly connecting the first protrusion with the second protrusion;
wherein the chain stay comprises:
   a continuous surface absent any discontinuities in an attachment area configured to receive the mount;
   wherein the mount is joinable with the chain stay at the attachment area;
   wherein the first elongated shape of the first protrusion has an hour-glass-like shape on a front side of the mount; and
   wherein the second elongated shape of the second protrusion has an hour-glass-like shape on a front side of the mount.

15. The combination of claim 14, wherein:
a back surface of the mount is absent any protrusions and is shaped to match an outer surface of the chain stay in the attachment area; and
the chain stay is absent any mitered recesses and has a continuous surface absent any discontinuities in the attachment area.

\* \* \* \* \*